US012684362B2

(12) United States Patent
Wang et al.

(10) Patent No.: US 12,684,362 B2
(45) Date of Patent: Jul. 14, 2026

(54) ENHANCED UPLINK SPECTRUM SHARING

(71) Applicant: Google LLC, Mountain View, CA (US)

(72) Inventors: Jibing Wang, San Jose, CA (US); Erik Richard Stauffer, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 554 days.

(21) Appl. No.: 18/027,803

(22) PCT Filed: Sep. 27, 2021

(86) PCT No.: PCT/US2021/052158
§ 371 (c)(1),
(2) Date: Mar. 22, 2023

(87) PCT Pub. No.: WO2022/076185
PCT Pub. Date: Apr. 14, 2022

(65) Prior Publication Data
US 2023/0379722 A1 Nov. 23, 2023

Related U.S. Application Data

(60) Provisional application No. 63/090,170, filed on Oct. 9, 2020.

(51) Int. Cl.
*H04W 16/14* (2009.01)
*H04W 72/21* (2023.01)
*H04W 72/27* (2023.01)

(52) U.S. Cl.
CPC ........... *H04W 16/14* (2013.01); *H04W 72/21* (2023.01); *H04W 72/27* (2023.01)

(58) Field of Classification Search
CPC ..... H04W 16/14; H04W 72/21; H04W 72/27; H04W 72/52; H04W 88/06
(Continued)

(56) References Cited

U.S. PATENT DOCUMENTS 10,743,335 B2 8/2020 Aiba et al.
10,999,883 B1 * 5/2021 Marupaduga ....... H04W 52/223
(Continued)

FOREIGN PATENT DOCUMENTS

CN 103548409 A 1/2014
CN 108989007 A 12/2018
(Continued)

OTHER PUBLICATIONS

Office Action dated Feb. 7, 2024 in related/corresponding EP Application No. 21801697.0.
(Continued)

*Primary Examiner* — Kwang B Yao
*Assistant Examiner* — Syed M Bokhari
(74) *Attorney, Agent, or Firm* — PATENT PORTFOLIO BUILDERS PLLC

(57) ABSTRACT

Techniques and apparatuses are described for enhanced uplink spectrum sharing. A base station communicates, to a user equipment (UE) an air interface resource configuration for a second air interface resource allocated to a second cell that uses a second radio access technology (RAT) and implemented by the base station. The base station receives a first air interface resource configuration for a first air interface resource allocated to a first cell that uses a first RAT, where the first air interface resource configuration differs from the second air interface resource configuration. In aspects, the base station communicates the first air interface resource configuration to the UE. Based on receiving a low-utilization indication for the first air interface resource, the base station directs the UE to utilize the first air interface resource for transmitting uplink communications using the second RAT.

16 Claims, 8 Drawing Sheets

(58) Field of Classification Search

USPC .......................................................... 370/329

See application file for complete search history.

(56) References Cited

U.S. PATENT DOCUMENTS

| | | | | |
|---|---|---|---|---|
| 11,291,066 | B2 * | 3/2022 | Takeda ................... | H04L 5/0053 |
| 2012/0014332 | A1 | 1/2012 | Smith et al. | |
| 2012/0202549 | A1 | 8/2012 | Eriksson et al. | |
| 2014/0369277 | A1 | 12/2014 | Lampinen et al. | |
| 2015/0237645 | A1 | 8/2015 | Andrianov et al. | |
| 2016/0014628 | A1 * | 1/2016 | Kim ...................... | H04W 76/28 |
| | | | | 370/329 |
| 2017/0034706 | A1 | 2/2017 | Ericson et al. | |
| 2018/0227902 | A1 | 8/2018 | Gholmieh et al. | |
| 2018/0270815 | A1 | 9/2018 | Bala et al. | |
| 2018/0316481 | A1 | 11/2018 | Montojo et al. | |
| 2018/0368199 | A1 | 12/2018 | Zeng et al. | |
| 2019/0109697 | A1 | 4/2019 | Lee et al. | |
| 2019/0173556 | A1 * | 6/2019 | Zhou ......................... | H04L 1/06 |
| 2019/0223049 | A1 * | 7/2019 | Zhang ................... | H04W 72/04 |
| 2019/0223243 | A1 | 7/2019 | Jibing et al. | |
| 2019/0254023 | A1 | 8/2019 | Qin | |
| 2019/0305915 | A1 | 10/2019 | Zhu et al. | |
| 2019/0394822 | A1 * | 12/2019 | Hosseini ........... | H04W 56/0045 |
| 2020/0033849 | A1 * | 1/2020 | Yiu ....................... | H04W 76/27 |
| 2021/0195614 | A1 | 6/2021 | Lin et al. | |
| 2021/0328727 | A1 * | 10/2021 | Ryu ...................... | H04L 1/1819 |
| 2021/0400709 | A1 * | 12/2021 | Namjoshi ............. | H04W 72/23 |

FOREIGN PATENT DOCUMENTS

| | | |
|---|---|---|
| CN | 109151931 A | 1/2019 |
| CN | 109983827 A | 7/2019 |
| CN | 111201826 A | 5/2020 |
| CN | 111263448 | 6/2020 |
| WO | 2018192444 | 10/2018 |
| WO | 2019062746 | 4/2019 |
| WO | 2022076185 | 4/2022 |

OTHER PUBLICATIONS

"5G Spectrum Public Policy Position", Huawei, Feb. 2020, Feb. 2020, 26 pages.

"International Search Report and Written Opinion", Application No. PCT/US2021/052158, Dec. 23, 2021, 12 pages.

"LTE + NR Uplink Spectrum Sharing", 3GPP TSG-RAN WG1#88 R1-1703194, Athens, Greece, Feb. 13-17, 2017, Feb. 2017, 4 pages.

"LTE-NR Co-existence", 3GPP TSG-RAN WG2 #97bis—R2-1703345, Apr. 2017, 5 pages.

"International Preliminary Report on Patentability", Application No. PCT/US2021/052158, Mar. 28, 2023, 8 pages.

Examination Report dated Oct. 3, 2023 in related/corresponding Australian Application No. 2021358680.

Office Action dated Aug. 23, 2024 in related/corresponding CA Application No. 3,194,676.

Examination Report dated Aug. 7, 2023 in related/corresponding Indian Application No. 202347023132.

Office Action dated Jun. 14, 2025 in related/corresponding CN Application No. 202180066752.6.

* cited by examiner

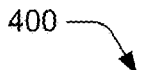
400
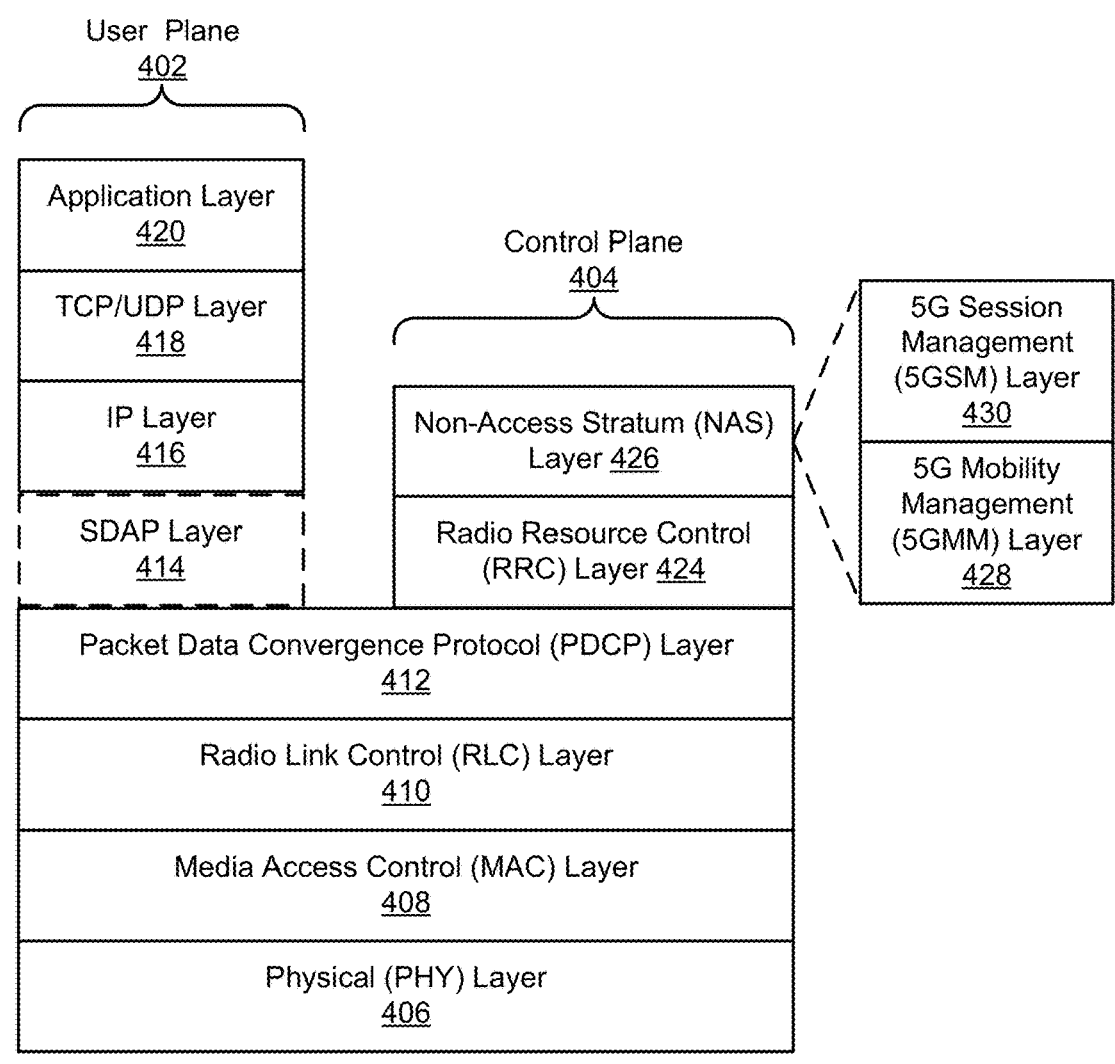
Fig. 4

600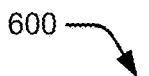

Communicate, to a UE, a second air interface resource configuration for a second air interface resource allocated to a second cell that uses a second RAT
605

Receive a first air interface resource configuration for a first air resource allocated to a first cell that uses a first RAT, the first air interface resource configuration being different from the second air interface resource configuration
610

Communicate the first air interface resource configuration to the UE
615

Receive a low-utilization indication for the first air interface resource
620

Direct the UE to utilize the first air interface resource for transmitting, to a base station, uplink communications using the second RAT
625

Fig. 6

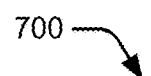

700

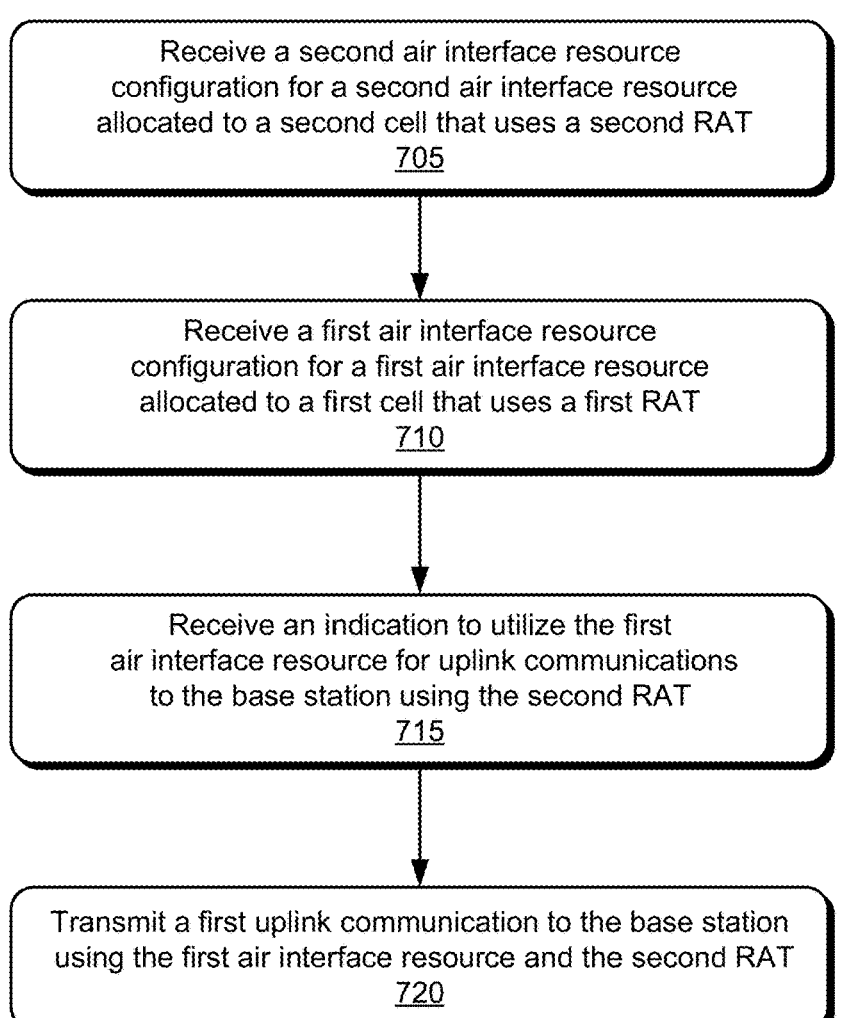

Receive a second air interface resource
configuration for a second air interface resource
allocated to a second cell that uses a second RAT
705

Receive a first air interface resource
configuration for a first air interface resource
allocated to a first cell that uses a first RAT
710

Receive an indication to utilize the first
air interface resource for uplink communications
to the base station using the second RAT
715

Transmit a first uplink communication to the base station
using the first air interface resource and the second RAT
720

Fig. 7

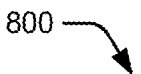
800
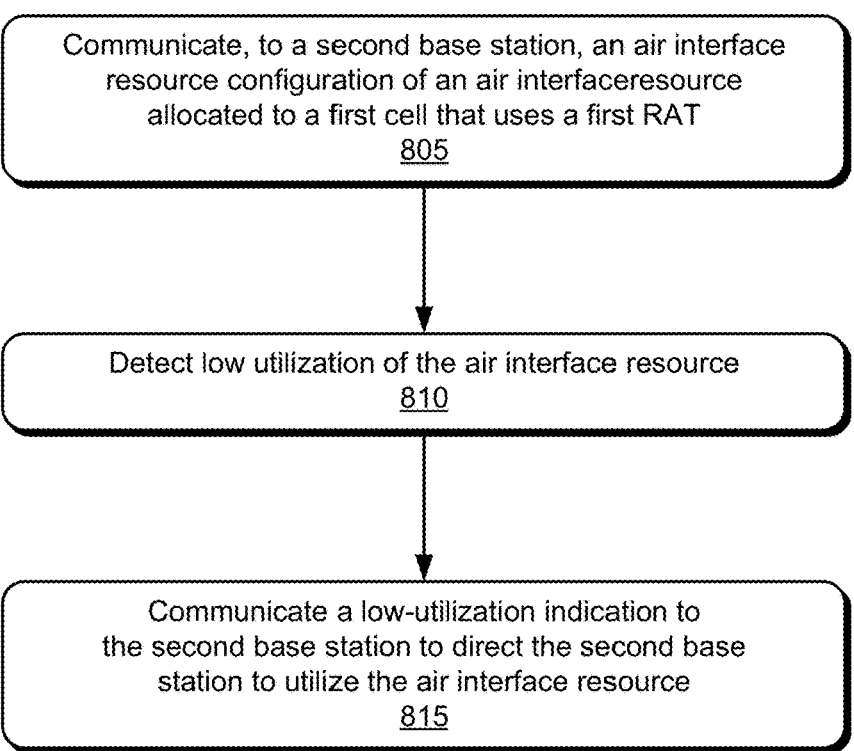
Communicate, to a second base station, an air interface resource configuration of an air interfaceresource allocated to a first cell that uses a first RAT
805
Detect low utilization of the air interface resource
810
Communicate a low-utilization indication to the second base station to direct the second base station to utilize the air interface resource
815
Fig. 8

ENHANCED UPLINK SPECTRUM SHARING

RELATED APPLICATION(S)

This application is a national stage entry of International Application No. PCT/US2021/052158, filed Sep. 27, 2021, which claims the benefit of U.S. Provisional Application No. 63/090,170, filed Oct. 9, 2020, the disclosures of which are incorporated herein by reference in their entirety.

BACKGROUND

A wide variety of contemporary devices include wireless capabilities. To illustrate, some Internet-of-Things (IoT) devices, such as a smart television (TV) or smart appliance, connect to wireless local area networks (WLAN) communication systems to access remote services. As another example, smart watches and laptops can connect to cellular communication systems to access remote data and/or services. While wireless-capable devices provide a user with additional flexibility and information, the increased number of devices can quickly consume air interface resources of the wireless networks and impact the reliability and availability of access to a wireless network.

Statically allocated resources (e.g., allocated resources on a recurrent and/or periodic basis) can further compound the availability of the air interface resources. To illustrate, consider an air interface resource shared between two base stations with overlapping cell and/or coverage areas using time-division multiplexing (TDM) such that a first base station accesses the shared air interface resource over a first time period and a second base station accesses the shared air interface resource over a second time period. While the static allocation provides each base station with access to the shared air interface resource, the static allocation also reduces the availability of the resource to each base station. Inefficiencies in using the statically allocated air interface resource can occur, such as when the first base station serves few-to-no devices and does not use the shared air interface resource during portions of the first time period. Because the first base station does not use the shared air interface resource during part of the first time period, and the static allocation prevents the second base station from using the shared air interface resource during the first time period, the shared air interface resource remains unused during the first time period. Thus, to increase capacity and deliver reliable wireless connections, evolving communication systems look for new approaches to efficiently utilize the available resources and avoid waste.

SUMMARY

This document describes techniques and apparatuses for enhanced uplink spectrum sharing. A base station communicates to a user equipment (UE) a second air interface resource configuration for a second air interface resource allocated to a second cell that uses a second radio access technology, RAT, and implemented by the base station. The base station receives a first air interface resource configuration for a first air interface resource allocated to a first cell that uses a first RAT, where the first air interface resource configuration differs from the second air interface resource configuration. In aspects, the base station communicates the first air interface resource configuration to the UE. Based on receiving a low-utilization indication for the first air interface resource, the base station directs the UE to utilize the first air interface resource for transmitting uplink communications using the second RAT.

In some aspects, a UE borrows an air interface resource allocated to a first cell that uses a first RAT to augment its air interface resources in a second cell that uses a second RAT and implemented by a base station. The UE receives, from the base station, a second air interface resource configuration for a second air interface resource allocated to the second cell that uses the second RAT. The UE also receives, from the base station, a first air interface resource configuration for a first air interface resource allocated to a first cell that uses a first RAT, where the first air interface resource configuration differs from the second air interface resource configuration. In aspects, the UE receives an indication to utilize the first air interface resource for uplink communications to the base station using the second RAT. Based on receiving the indication, the UE transmits an uplink communication to the base station using the first air interface resource and the second RAT.

In some aspects, a first base station shares an air interface resource allocated to a first cell that uses a first radio access technology (RAT) implemented by the first base station with a second cell that uses a second RAT implemented by a second base station. The first base station communicates, to the second base station, an air interface resource configuration for a air interface resource allocated to the first cell that uses the first RAT. The first base station then detects low utilization of the air interface resource. Based on detecting the low utilization, the first base station communicates a low-utilization indication to the second base station.

The details of one or more implementations of enhanced uplink spectrum sharing are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of enhanced uplink spectrum sharing are described below. The use of the same reference numbers in different instances in the description and the figures indicate similar elements:

FIG. 4 illustrates an example stack model that can implement various aspects of enhanced uplink spectrum sharing.

FIG. 6 illustrates an example method in accordance with various aspects of enhanced uplink spectrum sharing.

FIG. 7 illustrates an example method in accordance with various aspects of enhanced uplink spectrum sharing.

FIG. 8 illustrates an example method in accordance with various aspects of enhanced uplink spectrum sharing.

DETAILED DESCRIPTION

Figure 1:
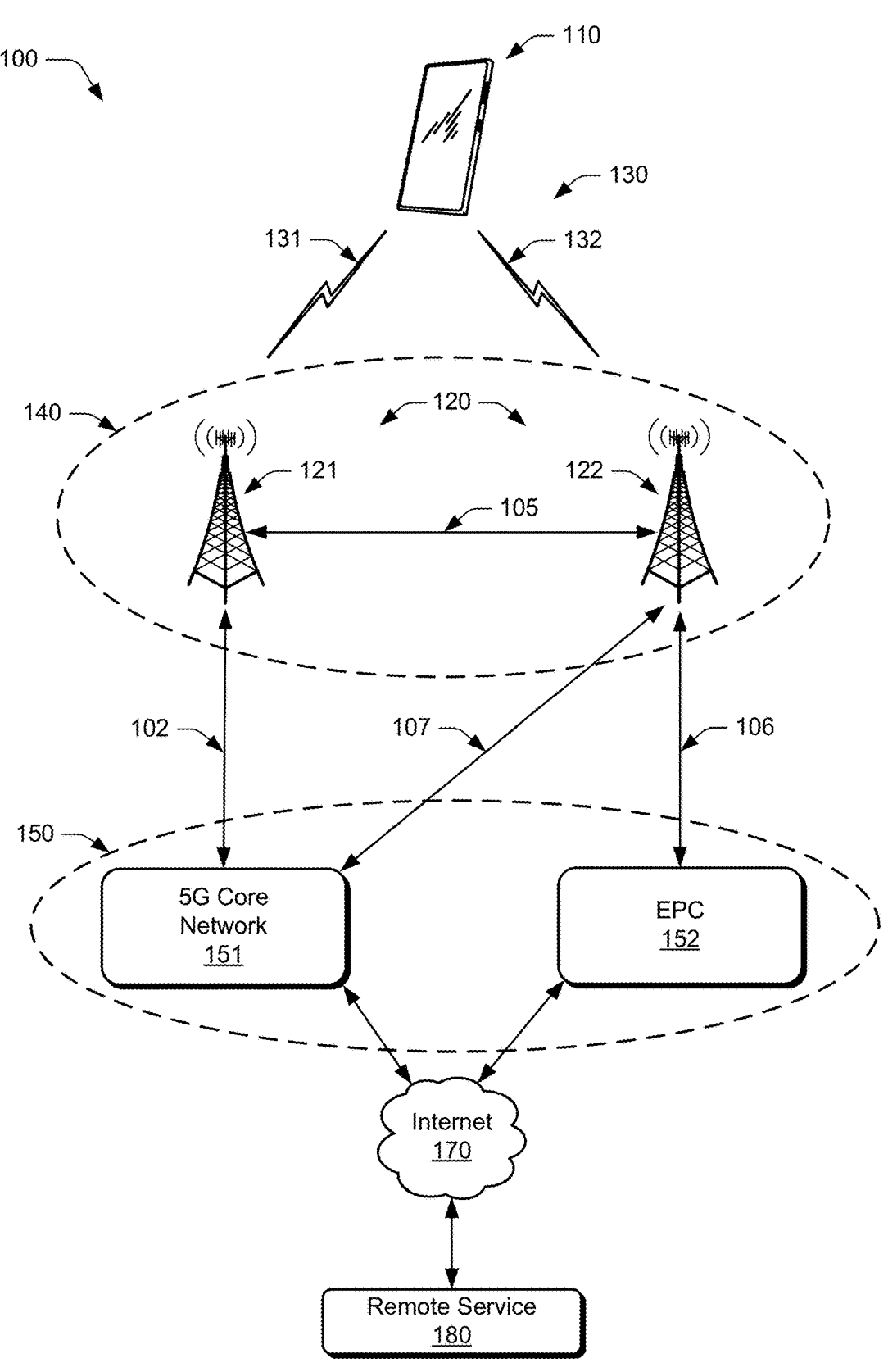
FIG. 1 illustrates an example environment that can implement various aspects of enhanced uplink spectrum sharing.

Various technologies, such as television and radio broadcasts, cellular networks, satellite communications, wireless local area networks (WLAN), and so forth, transmit wireless communications over different portions of the radio frequency spectrum. To avoid contentions between the transmissions, a regulatory body, such as the Office of Communications (Ofcom), the Ministry of Industry and Information Technology (MIIT), the National Telecommunications and Information Administration (NTIA), and the Federal Communications Commission (FCC), among others, governs how a particular region allocates portions of the radio frequency spectrum to the various technologies. Thus, in aspects, each technology has access to a finite portion of the spectrum, based on the spectrum plan mandated by the regulatory body.

The availability of a frequency band and/or portion of radio spectrum becomes strained as an increasing number of devices attempt to use the corresponding technology. To illustrate, a first base station serving a single user equipment (UE) can direct most of the allocated spectrum to the single UE, while a second base station serving multiple UEs divides the available radio spectrum amongst the multiple UEs. Because the frequency band and/or portion of radio spectrum allocated to the cellular technology implemented by the base stations has a finite size, each base station can simultaneously support only a finite number of UEs. Thus, to increase capacity and deliver reliable wireless connections, it is desirable to increase the efficiency of how the corresponding resources of the technology are used and to reduce wasted resources.

At times, Radio Access Technologies (RATs) share radio spectrum, such as by sharing a common frequency band through frequency-division multiplexing (FDM), time-division multiplexing (TDM), and so forth. As one example, fourth generation (4G) wireless networks dynamically share portions of the sub-3 Gigahertz (GHz) radio spectrum with fifth generation (5G) networks, using FDM, TDM, common air interface resource partitioning, and/or synchronized timebases. Alternatively, or additionally, a network operator of a radio access network (RAN) statically allocates (e.g., allocates on a recurrent or periodic basis) portions of the shared radio spectrum to each RAT implemented by base stations with overlapping cells and/or coverage areas. To illustrate, assume that the first RAT and the second RAT utilize common partitioning of the air interface resources, such as those described with reference to FIG. 3. Assume, also, that a first base station implements a first cell using a first RAT and a second base station implements a second cell using a second RAT, where the first cell and the second cell at least partially overlap (e.g., a first cell/coverage area of the first cell at least partially overlaps with a second cell/coverage area of the second cell). Using the common partitioning of the air interface resources, the first base station accesses the shared radio spectrum based on a first time duration, a first resource block, and/or a first frequency portion of the shared radio spectrum as statically allocated by the network operator. Similarly, the second base station accesses the shared radio spectrum based on a second time duration, a second resource block, and/or a second frequency portion of the shared radio spectrum as allocated by the network operator. Statically allocating these portions allows each RAT to access the shared radio spectrum on a periodic basis (e.g., frame-by-frame) for time-based allocations and/or continuously for frequency-based allocations. In aspects, a Radio Access Network (RAN) statically allocates the portions to each RAT implemented by one or more base station(s). Alternatively, or additionally, the RAN (statically) reallocates the portions based on cell capacity at each base station increasing or decreasing.

Static allocations of shared radio spectrum sometimes lead to inefficient use of the radio spectrum. For example, assume the first base station in the RAN has zero attached UEs while the second base station in the RAN covers a similar geographic area and has multiple attached UEs. Assume also that a first cell/coverage area provided by the first base station partially or fully overlaps with a second cell/coverage area provided by the second base station. In this example, the portion of the shared radio spectrum allocated to the first base station remains unused and leads to inefficient use of the radio spectrum while the second base station reaches capacity (e.g., a maximum number of UEs the second base station can serve) and potentially declines serving additional UEs.

In aspects of enhanced uplink spectrum sharing, a base station communicates, to a user equipment (UE), a second air interface resource configuration (e.g., a physical uplink control channel (PUCCH) resource configuration) for a second air interface resource (e.g., a second PUCCH resource) allocated to a second cell that uses a second radio access technology (RAT) and implemented by the base station. The base station receives a first air interface resource configuration (e.g., a first PUCCH resource configuration) for a first air interface resource (e.g., a first PUCCH resource) allocated to a first cell that uses a first RAT, where the first air interface resource configuration differs from the second air interface resource. In aspects, the base station communicates the first air interface resource configuration to the UE. Based on receiving a low-utilization indication for the first air interface resource, the base station directs the UE to utilize the first air interface resource for transmitting uplink communications using the second RAT.

Dynamically sharing statically allocated uplink air interface resources allows participating devices, such as base stations and corresponding UEs, to improve the utilization of the air interface resources. In turn, this increases the capacity and reliability of the corresponding wireless networks by dynamically providing the unused air interface resources to other devices for use.

Example Environment

FIG. 1 illustrates an example environment 100, which includes a user equipment 110 (UE 110) that can communicate with base stations 120 (illustrated as base stations 121 and 122) through one or more wireless communication links 130 (wireless links 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, and the like, or any combination thereof.

The base stations 120 communicate with the UE 110 using the wireless links 131 and/or 132, which may be implemented as any suitable type of wireless link. The wireless links 131 and 132 include control-plane information and/or user-plane data, such as downlink of user-plane data and control-plane information communicated from the base stations 120 to the UE 110, uplink of other user-plane data and control-plane information communicated from the UE 110 to the base stations 120, or both. The wireless links 130 may include one or more wireless links (e.g., radio links) or bearers implemented using any suitable communication protocol or standard, or combination of communication protocols or standards, such as Third Generation Partnership Project Long-Term Evolution (3GPP LTE), Fifth Generation New Radio (5G NR), and so forth. Multiple wireless links 130 may be aggregated in a carrier aggregation or multi-connectivity technology to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN, NR RAN), where the RAN 140 communicates with one or more core networks 150 (core network 150). To illustrate, the base station 121 connects, at interface 102, to a 5G core network 151 (5GC 151) through an NG2 interface for control-plane signaling and using an NG3 interface for user-plane data communications. The base station 122 connects, at interface 106, to an Evolved Packet Core 152 (EPC 152) using an Si interface for control-plane signaling and user-plane data communications. Alternatively, or additionally, if the base station 122 connects to the 5GC 151 core network, the base station 122 connects to the 5GC 151 using an NG2 interface for control-plane signaling and through an NG3 interface for user-plane data communications, at interface 107. Accordingly, certain base stations 120 can communicate with multiple core networks 150 (e.g., 5GC 151, EPC 152).

In addition to wireless links to core networks, the base stations 120 may communicate with each other. For example, the base stations 121 and 122 communicate through an Xn interface at interface 105 to coordinate proportioning air interface resources as further described.

The UE 110 may connect, through the 5G core network 151 or the Evolved Packet Core Network 152, to public networks, such as the Internet 170, to interact with a remote service 180. The remote service 180 represents the computing, communication, and storage devices used to provide any of a multitude of services, including interactive voice or video communication, file transfer, streaming audio, voice, or video, and other technical services implemented in any manner such as voice calls, video calls, website access, messaging services (e.g., text messaging or multimedia messaging), photo file transfer, enterprise software applications, social media applications, video-gaming, streaming video or audio services, and podcasts.

Example Devices

Figure 2:
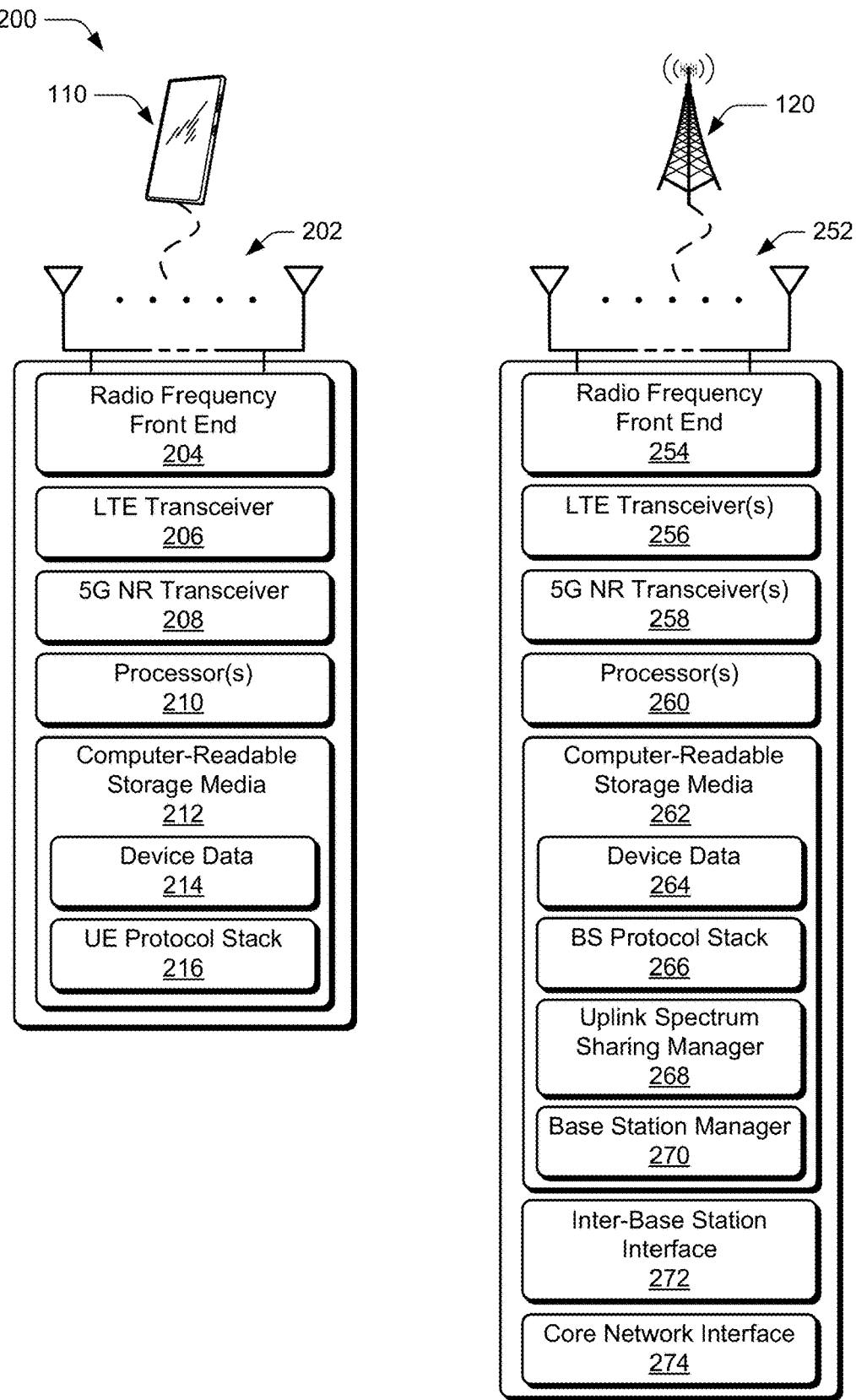
FIG. 2 illustrates an example device diagram of devices that can implement various aspects of enhanced uplink spectrum sharing.

FIG. 2 illustrates an example device diagram 200 of the UE 110 and one of the base stations 120 that can implement various aspects of enhanced uplink spectrum sharing in a wireless communication system. The UE 110 and/or the base station 120 may include additional functions and interfaces that are omitted from FIG. 2 for the sake of clarity.

The UE 110 includes antennas 202, a radio frequency front end 204 (RF front end 204), and a wireless transceiver (e.g., an LTE transceiver 206, and/or a 5G NR transceiver 208) for communicating with the base station 120 in the RAN 140. The RF front end 204 of the UE 110 can couple or connect the LTE transceiver 206 and the 5G NR transceiver 208 to the antennas 202 to facilitate various types of wireless communication. The antennas 202 of the UE 110 may include an array of multiple antennas that are configured in a manner similar to or different from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz (GHz) bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single-core processor or a multiple-core processor composed of a variety of materials, such as silicon, poly-silicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, some of which are executable by processor(s) 210 to enable user-plane data, control-plane information, and user interaction with the UE 110.

The CRM 212 of the UE 110 includes a UE communication system protocol stack 216 (UE protocol stack 216). Alternatively, or additionally, the UE protocol stack 216 may be implemented in whole or part as hardware logic or circuitry integrated with or separate from other components of the UE 110. In aspects, the UE protocol stack 216 of the UE 110 implements how devices in a communication system exchange information, such as by implementing multiple layers that act as entities for communication with another device using the protocols defined for the layer as further described with reference to FIG. 4. In aspects, the UE protocol stack 216 processes messages and/or indications from the base station 120, such as a first message that includes a first PUCCH resource configuration for a first PUCCH resource allocated to uplink communications that use a first RAT implemented by the base station 120, a second message that includes a second PUCCH resource configuration for a second PUCCH resource allocated to uplink communications that use a second RAT, and/or a third message (or indication) that directs the UE 110 to utilize the second PUCCH resource for uplink communications of the first RAT as further described.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this split base station functionality varies and includes terms such as Central Unit (CU), Distributed Unit (DU), Baseband Unit (BBU), Remote Radio Head (RRH), and/or Remote Radio Unit (RRU). The base station 120 includes antennas 252, a radio frequency front end 254 (RF front end 254), one or more wireless transceivers (e.g., one or more LTE transceivers 256, and/or one or more 5G NR transceivers 258) for communicating with the UE 110. The RF front end 254 of the base station 120 can couple or connect the LTE transceivers 256 and the 5G NR transceivers 258 to the antennas 252 to facilitate various types of wireless communication. The antennas 252 of the base station 120 may include an array of multiple antennas that are configured in a manner similar to, or different from, each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive multiple-input, multiple-output (Massive-MIMO), for the transmission and reception of communications with the UE 110.

The base station 120 also includes processor(s) 260 and computer-readable storage media 262 (CRM 262). The processor 260 may be a single-core processor or a multiple-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the UE 110.

In aspects, the CRM 262 of the base station 120 also includes a base station-communication system protocol stack 266 (BS protocol stack 266). Alternatively, or additionally, the BS protocol stack 266 may be implemented in whole or part as hardware logic or circuitry integrated with or separate from other components of the base station 120. At times, the BS protocol stack 266 communicates with the UE protocol stack 216 using complementary operations, such as those described with reference to FIG. 4.

The CRM 262 also includes an uplink spectrum sharing manager 268. Alternatively, or additionally, the uplink spectrum sharing manager 268 may be implemented in whole or in part as hardware logic or circuitry integrated with or separate from other components of the base station 120. While the diagram 200 illustrates the uplink spectrum sharing manager 268 separately from the BS protocol stack 266, alternative or additional implementations include aspects of the uplink spectrum sharing manager 268 in the BS protocol stack 266.

In some aspects, the uplink spectrum sharing manager 268 communicates a PUCCH configuration statically allocated to uplink communication for the base station 120 to a second base station 120. Alternatively, or additionally, the uplink spectrum sharing manager 268 identifies one or more conditions that indicate low utilization of an uplink air interface resource for the base station 120. Generally, low utilization corresponds to an expected number of transmissions below a threshold value and/or at zero. In aspects, the uplink spectrum sharing manager 268 determines an expected number of transmissions that use the uplink air interface resource is below a threshold value and/or is at zero, based on synchronized transmissions.

To illustrate, the uplink spectrum sharing manager 268 monitors downlink communications on a Physical Downlink Shared Channel (PDSCH) and identifies an absence of downlink transmissions on the PDSCH over a time interval. In various communication systems, a device receiving the downlink transmissions over the PDSCH (e.g., UE 110) transmits acknowledgment/negative-acknowledgments (ACK/NACKs) to the base station 120 using a PUCCH resource allocated for uplink communications to the base station 120. More particularly, the device transmits the ACK/NACKs to the base station synchronously (e.g., within an expected timeframe) such that the base station 120 anticipates when to receive the ACK/NACKs. In aspects, the uplink spectrum sharing manager 268 identifies the lack of downlink communications over the PDSCH as a condition that indicates (an expected) low utilization of uplink air interface resources, because the lack of downlink PDSCH transmissions indicates a lack of corresponding ACK/NACKs transmitted over the PUCCH. Based on identifying the one or more conditions, the uplink spectrum sharing manager 268 directs the second base station to utilize the PUCCH resource allocated to uplink communications for the base station 120. Alternatively, or additionally, the uplink spectrum sharing manager 268 indicates a start time to use the PUCCH resource and/or a stop time to cease using the PUCCH resource. In some aspects, the uplink spectrum sharing manager 268 communicates a Boolean or toggle field that indicates an availability (e.g., available, unavailable, change in availability) of the PUCCH resource.

In some aspects, the uplink spectrum sharing manager 268 receives an indication of a PUCCH resource configuration from the uplink spectrum sharing manager 268 of another base station. In other words, the uplink spectrum sharing manager 268 receives a PUCCH resource configuration for a PUCCH resource allocated to uplink communications of the other base station. The uplink spectrum sharing manager 268 identifies a UE to forward the PUCCH resource configuration to and directs the base station 120 to transmit the PUCCH resource configuration to the UE, such as through the BS protocol stack 266 and using a radio resource control (RRC) message. To illustrate, the uplink spectrum sharing manager 268 identifies a UE based on priority (e.g., a UE exchanging higher-priority communications relative to other UEs attached to the base station 120) or a UE based on loading (e.g., a UE exchanging more user-plane data relative to other UEs attached to the base station 120). Alternatively or additionally, the uplink spectrum sharing manager 268 receives an indication of low utilization of the PUCCH resource and determines to use the PUCCH resource allocated to uplink communications for the other base station, such as by identifying that the number of connected UEs exceeds a first threshold value or that the expected uplink communications from an attached UE exceed a second threshold value. In aspects, the uplink spectrum sharing manager 268 directs the UE to utilize the PUCCH resource, such as through the BS protocol stack 266 and using a Medium Access Control (MAC) control element (CE), a physical downlink control channel (PDCCH) message, layer 1 messaging, layer 2 messaging, or RRC messages. This can include the uplink spectrum sharing manager 268 indicating a start time and/or stop time to the UE as to when to begin using and/or cease using the PUCCH resource allocated for uplink communications to the other base station.

CRM 262 also includes a base station manager 270. Alternatively, or additionally, the base station manager 270 may be implemented in whole or in part as hardware logic or circuitry integrated with or separate from other components of the base station 120. In at least some aspects, the base station manager 270 configures the LTE transceivers 256 and the 5G NR transceivers 258 for communication with the UE 110, as well as communication with a core network, such as the core network 150.

The base station 120 also includes an inter-base station interface 272, such as an Xn and/or X2 interface, which the base station manager 270 configures to exchange user-plane data, control-plane information, and/or other data/information between other base stations, to manage the communication of the base station 120 with the UE 110. The base station 120 includes a core network interface 274 that the base station manager 270 configures to exchange user-plane data, control-plane information, and/or other data/information with core network functions and/or entities.

Air Interface Resources

Figure 3:
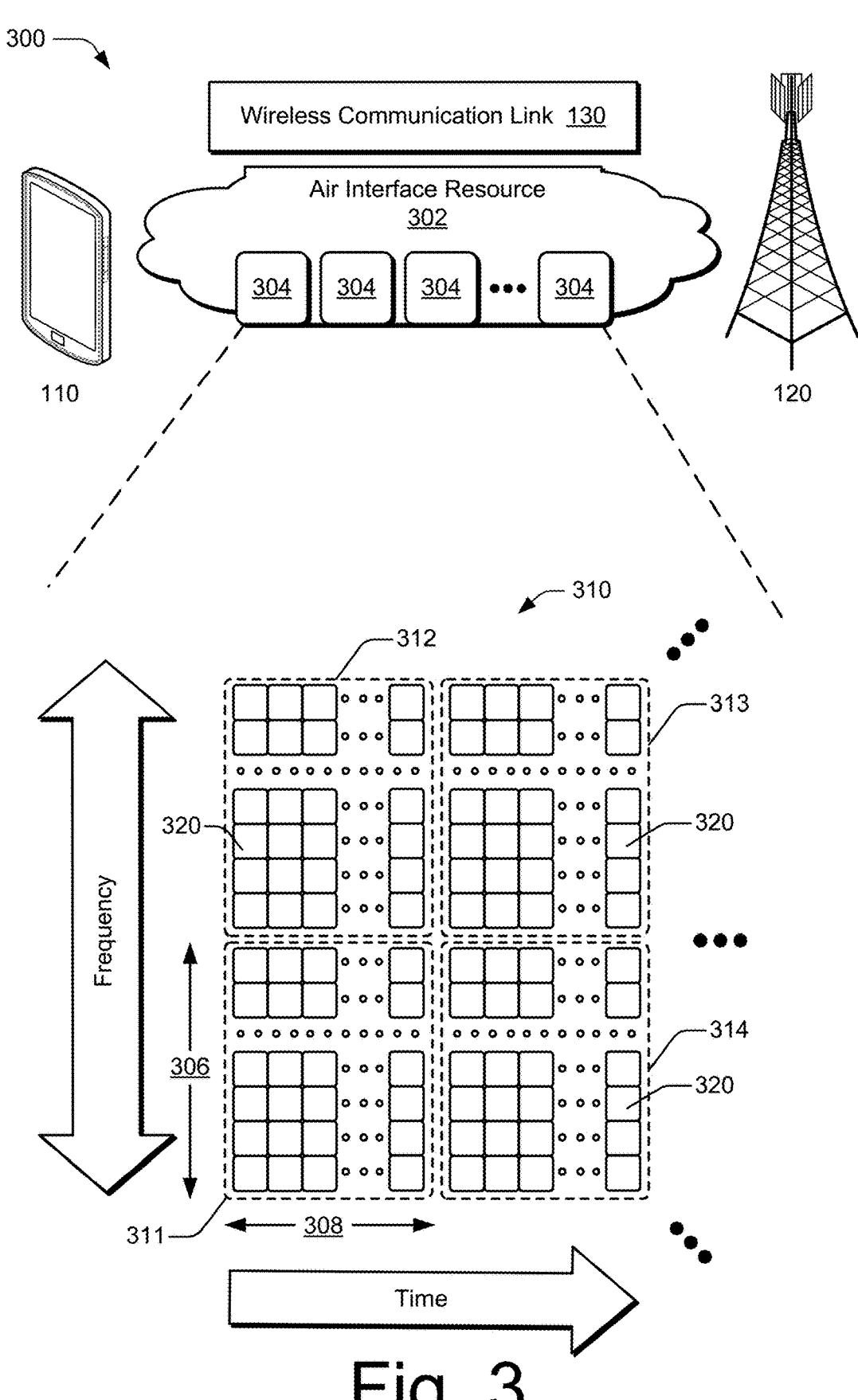
FIG. 3 illustrates an example air interface resource that extends between a user equipment and a base station that can be used in accordance with various aspects of enhanced uplink spectrum sharing.

FIG. 3 illustrates an air interface resource that extends between a user equipment and a base station that can be used to implement various aspects of enhanced uplink spectrum sharing. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 (wireless links 130) of multiple user equipment 110. In the lower-left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

Example Protocol Stack

FIG. 4 illustrates an example block diagram of a wireless network stack model 400 (network stack 400) that can be used to implement various aspects of enhanced uplink spectrum sharing. The network stack 400 characterizes a communication system for the example environment 100 that can be used to implement aspects of adaptive selection of a network access mode by a user equipment. The network stack 400 includes a user plane 402 and a control plane 404. Upper layers of the user plane 402 and the control plane 404 share common lower layers in the network stack 400. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 406, a Media Access Control (MAC) layer 408, a Radio Link Control (RLC) layer 410, and a PDCP layer 412. The PHY layer 406 provides hardware specifications for devices that communicate with each other. Accordingly, the PHY layer 406 establishes how devices connect to each other, assists in managing how communication resources are shared among devices and the like.

The MAC layer 408 specifies how data is transferred between devices. Generally, the MAC layer 408 provides a way in which data packets being transmitted are encoded and decoded into bits as part of a transmission protocol.

The RLC layer 410 provides data-transfer services to higher layers in the network stack 400. Generally, the RLC layer 410 provides error correction, packet segmentation, and reassembly, and management of data transfers in various modes, such as acknowledged, unacknowledged, or transparent modes.

The PDCP layer 412 provides data-transfer services to higher layers in the network stack 400. Generally, the PDCP layer 412 provides the transfer of user plane 402 and control plane 404 data, header compression, ciphering, and integrity protection.

Above the PDCP layer 412, the stack splits into the user plane 402 and the control plane 404. Layers of the user plane 402 include an optional Service Data Adaptation Protocol (SDAP) layer 414, an Internet Protocol (IP) layer 416, a Transmission Control Protocol/User Datagram Protocol (TCP/UDP) layer 418, and an application layer 420, which transfers data using the interface 106. The optional SDAP layer 414 is present in 5G NR networks. The SDAP layer 414 maps a Quality of Service (QoS) flow for each data radio bearer and marks QoS flow identifiers in uplink and downlink data packets for each packet data session. The IP layer 416 specifies how the data from the application layer 420 is transferred to a destination node. The TCP/UDP layer 418 is used to verify that data packets intended to be transferred to the destination node reached the destination node, using either TCP or UDP for data transfers by the application layer 420. In some implementations, the user plane 402 may also include a data services layer (not shown) that provides data transport services to transport application data, such as IP packets including web-browsing content, video content, image content, audio content, or social media content.

The control plane 404 includes a Radio Resource Control (RRC) layer 424 and a Non-Access Stratum (NAS) layer 426. The RRC layer 424 establishes and releases connections and radio bearers, broadcasts system information, or performs power control. The RRC layer 424 also controls a resource control state of the UE 110 and directs the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 424 supports 3GPP access but does not support non-3GPP access (e.g., WLAN communications).

The NAS layer 426 provides support for mobility management (e.g., using a Fifth-Generation Mobility Management (SGMM) layer 428) and packet data bearer contexts (e.g., using a Fifth-Generation Session Management (SGSM) layer 430) between the UE 110 and entities or functions in the core network, such as an Access and Mobility Management Function of the 5GC 151 or the like. The NAS layer 426 supports both 3GPP access and non-3GPP access.

In the UE 110, each layer in both the user plane 402 and the control plane 404 of the network stack 400 interacts with a corresponding peer layer or entity in the base station 120, a core network entity or function, and/or a remote service, to support user applications and control operation of the UE 110 in the RAN 140.

Enhanced Uplink Spectrum Sharing

To increase capacity and deliver reliable wireless connections, evolving communication systems look for new approaches to more efficiently utilize air interface resources. As one example, various RATs oftentimes allocate Physical Uplink Control Channel (PUCCH) resources to a fixed region of a frequency band, such as a top portion of the frequency band and/or a bottom portion of the frequency band. By allocating the PUCCH resources at the edges of a frequency band, the RATs reduce fragmentation and leave a center portion of the frequency band for other transmissions, such as physical uplink shared channel (PUSCH) transmissions that utilize multiple (contiguous) resource blocks.

In aspects of enhanced uplink spectrum sharing, base stations that implement different RATs communicate with one another to dynamically share statically allocated air interface resources, such as sharing a PUCCH resource statically allocated to uplink communications that use a first RAT for use in transmitting uplink communications that use a second RAT. The static allocation of the air interface resources can include time-based allocations that statically divide air interface resources using orthogonal (e.g., separate and non-overlapping) time periods, such as a frame, subframe, or time slot. Alternatively, or additionally, the static allocation can include frequency-based allocations that statically divide air interface resources into orthogonal frequency portions (e.g., subcarriers, frequency sub-bands). As yet another example, the static allocation can include resource-block-based allocations, such as those described with reference to FIG. 3. Dynamically sharing the statically allocated uplink air interface resources increases the utilization efficiency of the corresponding air interface resources and results in improved capacity and reliability of wireless connections in the corresponding wireless network.

Figure 5:
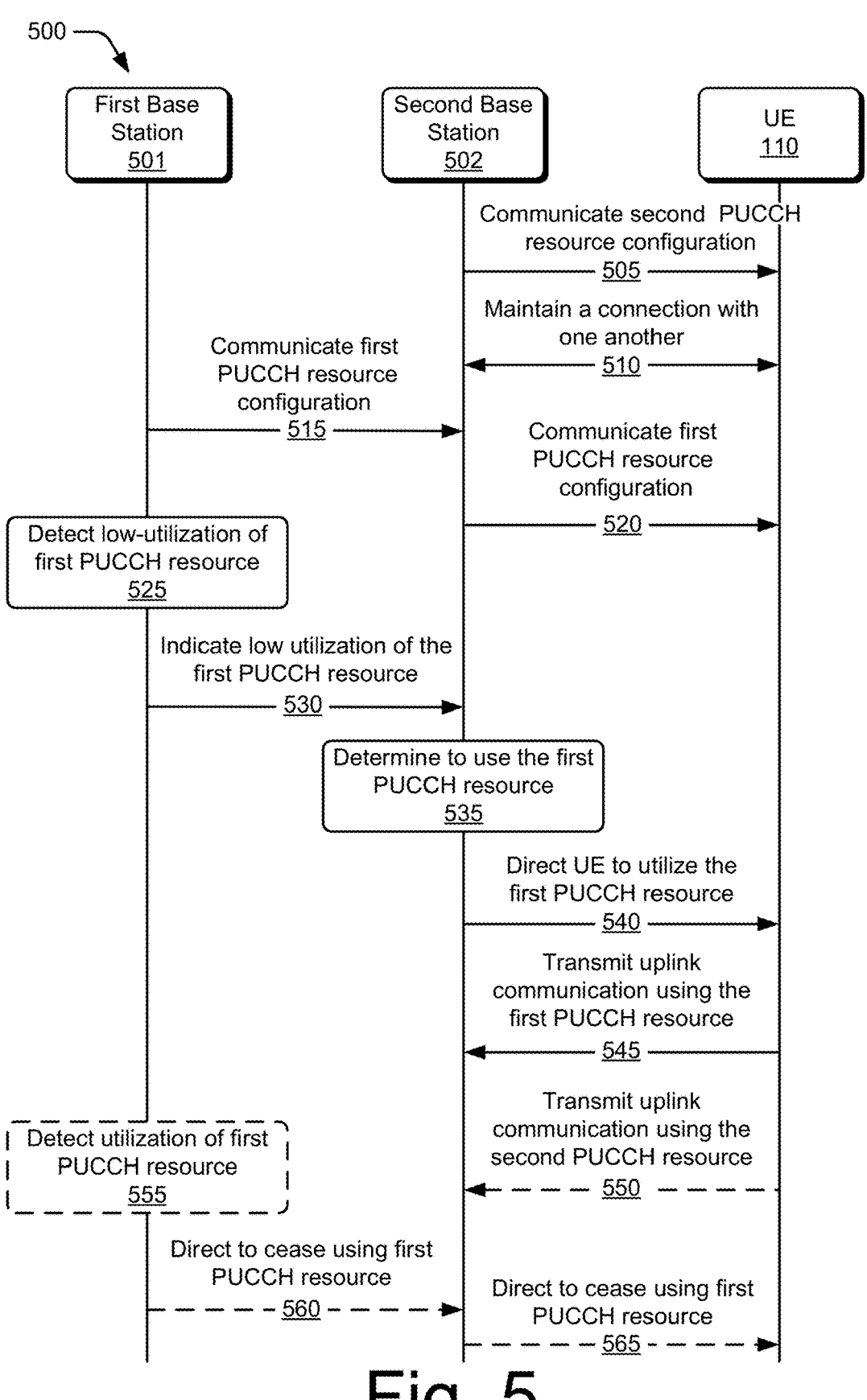
FIG. 5 illustrates an example transaction diagram between various network entities in accordance with various aspects of enhanced uplink spectrum sharing.

FIG. 5 illustrates an example signaling and control transaction diagram 500 in accordance with one or more aspects of enhanced uplink spectrum sharing. In aspects, operations of the signaling and control transactions may be performed by any combination of devices, including a first base station 501 (e.g., base station 121 or base station 122), a second base station 502 (e.g., base station 122 or base station 121), and the UE 110 using aspects as described with reference to any of FIGS. 1-4.

In the diagram 500, the base station 502 implements a second RAT (RAT2) and the base station 501 implements a first RAT (RAT1), where the second RAT and the first RAT operate in common radio spectrum and utilize common air interface resource partitioning. Alternatively, or additionally, a first cell/coverage area provided by the base station 501 at least partially overlaps with a second cell/coverage area provided by base station 502. As one example of common radio spectrum and/or common air interface resource partitioning, assume that RAT1 and RAT2 correspond to 4G and 5G (or vice versa) and that the base station 501 and the base station 502 operate in common radio spectrum (e.g., a portion of the sub-3 GHz band) using common air interface resource partitioning, such as that described with reference to FIG. 3. Assume, also, that the base station 501 and the base station 502 reside in a common RAN (e.g., RAN 140). Because the base station 501 and the base station 502 utilize common air interface resource partitioning and operate in common radio spectrum, a network operator controlling the configuration of the corresponding RAN statically allocates a first portion of the common radio spectrum (e.g., air interface resources, such as PUCCH resources) for RAT1 uplink communications with the base station 501 and a second portion of the common radio spectrum (e.g., air interface resources, such as additional PUCCH resources) for RAT2 uplink communications with the base station 502. This can include the network operator allocating the common radio spectrum using any combination of time-based, frequency-based, and/or resource-block-based portioning for the static allocations as further described. While the diagram 500 illustrates the base station 501 and the base station 502 as separate entities, some aspects of enhanced uplink spectrum sharing include co-located elements of the base stations 501, 502 (e.g., sharing a same baseband unit, sharing a same baseband processor, or same baseband hardware resources).

As illustrated, at 505, the base station 502 communicates a second PUCCH resource configuration for a second PUCCH resource to the UE 110. As one example, the base station 502 communicates the second PUCCH resource configuration to the UE 110 during an initial access procedure. Alternatively, or additionally, the base station 502 communicates the second PUCCH resource configuration to the UE 110 after a radio resource control (RRC) configuration/reconfiguration. The base station 502 can communicate a common PUCCH configuration that conveys cell-specific PUCCH configuration parameters and/or a UE-specific PUCCH configuration. To illustrate, the base station 502 communicates, as the second PUCCH resource configuration, any combination of timing information, PUCCH format parameters, code rates, resource identification (ID), resource block (RB) allocations, PUCCH region, reference signal structure information, coding schemes, and so forth. In some aspects, the second PUCCH resource configuration corresponds to a PUCCH resource statically allocated to uplink control communications of the second RAT to the base station 502, as further described. The base station 502 communicates the second PUCCH resource configuration to the UE 110 in conformance with the second RAT. In aspects, the base station 502 communicates air interface resource configurations based on air interface resource partitioning (e.g., FIG. 3) as defined by the second RAT and/or common air interface resource partitioning shared between multiple RATs.

At 510, the base station 502 and the UE 110 maintain a connection with one another. To illustrate, the UE 110 maintains a connection with the base station 502 while operating in an RRC_CONNECTED mode or an RRC_I-NACTIVE mode. In aspects, the UE 110 maintains the connection with the base station 502 while operating in a standalone mode (e.g., communicating with the base station 502 using a single RAT). In other words, the UE 110 maintains a connection with the base station 502 without a second connection with the base station 501 (e.g., without using carrier aggregation (CA), without using dual-connectivity (DC)). Alternatively, the UE 110 maintains a connection with the base station 502 while operating in a non-standalone mode that can include a second connection with the base station 501 or a third base station (not illustrated).

At 515, the base station 501 communicates a first PUCCH resource configuration for a first PUCCH resource to the base station 502. To illustrate, the base station 501 communicates the first PUCCH resource configuration to the base station 502 using an Xn interface (e.g., the interface 105). In aspects, the first PUCCH resource configuration corresponds to a PUCCH resource statically allocated to uplink communications for the first RAT in the second cell supported by the base station 501 as further described. The base station 501 communicates any combination of configuration parameters to indicate the first PUCCH resource configuration, such as any combination of timing information, PUCCH format parameters, code rates, resource identification (ID), resource block (RB) allocations, PUCCH region, reference signal structure information, coding schemes, and so forth. In aspects, the first PUCCH resource differs from the second PUCCH resource (e.g., the first PUCCH resource does not overlap with the second PUCCH resource in time or frequency). For example, the first PUCCH resource uses a different frequency partition, time duration, coding scheme, and so forth, than the first PUCCH resource. In aspects, the base station 501 communicates air interface resource configurations based on air interface resource partitioning (e.g., FIG. 3) as defined by the first RAT and/or common air interface resource partitioning shared between multiple RATs.

At 520, the base station 502 communicates the first PUCCH resource configuration to the UE 110. In aspects, the base station 502 communicates the first PUCCH resource configuration by transmitting the first PUCCH resource configuration to the UE 110 in an RRC message, where the base station 502 implicitly or explicitly directs the UE 110 to refrain from using the first PUCCH resource until receiving a notification to begin using the first PUCCH resource.

At 525, the base station 501 detects low utilization of the first PUCCH resource. For instance, the base station 501 detects one or more conditions indicative of (an expected) low utilization of uplink resources, such as by detecting an absence of downlink transmissions on a PDSCH over a time interval. To illustrate, the base station 501, by way of the uplink spectrum sharing manager 268, sets a timer and monitors for outgoing downlink transmissions on a PDSCH by the base station 501. If the uplink spectrum sharing manager 268 of the base station 501 detects an outgoing downlink transmission on the PDSCH, the uplink spectrum sharing manager 268 resets the timer. Alternatively, if the timer expires, the uplink spectrum sharing manager 268 detects the occurrence of a condition of low utilization (e.g., the absence of downlink transmissions) because the lack of downlink PDSCH transmissions indicates a lack of corresponding ACK/NACKs transmitted over the PUCCH as further described.

At 530, the base station 501 indicates (an expected) low utilization of the second PUCCH resource to the base station 502. In aspects, the base station 501 indicates the low utilization to the base station 502 using an Xn interface (e.g., the interface 105). Alternatively, or additionally, the base station 501 communicates one or more time metrics with the indication of low utilization, such as a start-time metric that indicates when the first PUCCH resource will be available to borrow/share, a stop-time metric that indicates when the first PUCCH resource may be unavailable to borrow/share, or a time duration metric that indicates a PUCCH-resource-availability time window. While the diagram 500 illustrates the base station 502 communicating the second PUCCH resource configuration to the UE 110 at 505 and prior to communicating the first PUCCH resource configuration at 520 (by way of the base station 501 and the base station 502 communicating at 515), other implementations can include the base station 502 communicating the first PUCCH resource configuration to the UE 110 prior to communicating the second PUCCH resource configuration at 505.

At 535, the base station 502 determines to use the first PUCCH resource. As one example, the base station 502 identifies that the number of connected UEs (e.g., maintaining a connection to the base station 502 as described at 510) exceeds a first threshold value and determines to use the first PUCCH resource. As another example, the base station 502 determines that the expected uplink HARQ feedback (e.g., ACK/NACK signals) from the UE 110 exceeds a second threshold value.

At 540, the base station 502 directs the UE 110 to utilize the first PUCCH resource. For example, the base station 502 directs the UE to utilize the first PUCCH resource using Physical Downlink Control Channel (PDCCH) messaging, a Medium Access Control (MAC) Control Element (MAC CE), layer 1 signaling, layer 2 messaging, or an RRC message. In some aspects, the base station 502 indicates a start time and/or stop time to the UE 110, where the start time indicates when to begin using the first PUCCH resource, and the stop time indicates when to cease using the first PUCCH resource. Alternatively or additionally, the base station 502 transmits a Boolean or toggle field that indicates the availability (e.g., available, unavailable) of the first PUCCH resource. In aspects, the base station 502 communicates the first PUCCH resource configuration of the first PUCCH resource at 520 using a first communication mechanism (e.g., an RRC message) that is slower relative to a second communication mechanism (e.g., MAC CE, layer 1 signaling, layer 2 messages). Alternatively or additionally, the base station 502 communicates the first and second PUCCH resource configurations using similar communication mechanisms (e.g., RRC messaging, layer 1 signaling, or layer 2 messaging).

By communicating 520, the first PUCCH resource configuration to the UE 110 separately from directions 540 to utilize the first PUCCH resource, the base station 502 can quickly respond to the low-utilization indication from the base station 501 and direct the UE 110 to begin using the first PUCCH resource. To illustrate, a communication 520 that includes the first PUCCH resource configuration may utilize more air interface resources relative to a communication 540 that directs the UE 110 to begin using the first PUCCH resource because the first PUCCH resource configuration includes more information (e.g., air interface resource configuration parameters). Using a separate direction communication 540 reduces transmission latencies and improves the efficiency with which the base stations (and corresponding RATs and cells) share the first PUCCH resource.

At 545, the UE 110 transmits one or more uplink control communications using the first PUCCH resource, where the UE 110 transmits the uplink communications using the second RAT supported by the base station 502. To illustrate, the UE 110 transmits one or more ACK/NACKs to the base station 502 using the first PUCCH resource, where the ACK/NACKS provide HARQ feedback for downlink PDSCH transmissions from the base station 502 (using the second RAT). Alternatively or additionally, the UE 110 transmits one or more uplink user-plane data communications using the first PUCCH resource.

Oftentimes, a first UE communicating with a first base station using a first RAT has a different identity (e.g., Cell Radio Network Temporary Identifier (C-RNTI) information) than a second UE communicating with a second base station using a second RAT. In aspects, the UE 110 encodes or scrambles uplink transmissions that use the first PUCCH resource with identity information associated with the second RAT. The base station 502 then decodes and/or unscrambles the uplink transmission using the identity information (e.g., C-RNTI of the second base station). However, because the base station 501 uses different identity information (e.g., C-RNTI of the first base station), the base station 501 fails to decode and/or unscramble the uplink transmissions from the UE 110 that use the first PUCCH resource and are encoded using the C-RNTI of the second base station.

At 550, the UE 110 optionally transmits uplink communications using the second PUCCH resource. This can include the UE 110 contemporaneously transmitting uplink communications using the second PUCCH resource with the uplink communication transmitted at 545 using the first PUCCH resource. To illustrate, assume at 540 that the base station 502 communicates a start time and a stop time that defines a PUCCH-resource-availability time window when the UE 110 can transmit uplink communications using the first PUCCH resource. In aspects, the UE 110 contemporaneously uses the second PUCCH resource and the first PUCCH resource, such as by transmitting uplink control-plane information using the first PUCCH resource while transmitting additional uplink control information using the second PUCCH resource.

At 555, the base station 501 optionally detects (expected) utilization of the first PUCCH resource. For example, similar to that described at 525, the base station 501 detects one or more transmissions on the PDSCH and identifies the transmissions as indicative of (an expected) utilization of uplink resources (e.g., ACK/NACKs). At 560 and based on detecting (expected) utilization of the first PUCCH resource, the base station 501 optionally directs the base station 502 to cease using the first PUCCH resource and/or indicates that the first PUCCH resource is unavailable. To illustrate, and similar to that described at 530, the base station 501 communicates with the base station 502 using an Xn interface and directs the base station to cease using the first PUCCH resource and/or that the first PUCCH resource is unavailable. At 565, and based on receiving the directions to cease using the first PUCCH resource, the base station 502 directs the UE 110 to cease using the first PUCCH resource, such as by communicating the directions using a MAC CE, layer 1 signaling, layer 2 messaging, or an RRC message as described at 540.

Dynamically sharing statically allocated uplink air interface resources allows participating devices, such as base stations and corresponding UEs, to more efficiently use the air interface resources and improves the capacity and reliability of the corresponding wireless networks.

Example Methods

Example methods 600, 700, and 800 are described with reference to FIGS. 6, 7, and 8 in accordance with one or more aspects of enhanced uplink spectrum sharing. FIG. 6 illustrates an example method 600 used to perform aspects of enhanced uplink spectrum sharing, such as sharing a physical uplink control channel (PUCCH) resources allocated to a first cell that uses a first radio access technology (RAT) with a second cell that uses a second RAT implemented by a base station. In some implementations, operations of the method 600 are performed by the base station, such as the base station 120 of FIG. 1 and/or the base station 502 of FIG. 5.

At 605, a base station communicates, to a UE, a second air interface resource configuration for a second air interface resource allocated to a second cell that uses a second RAT. For example, the base station 502 communicates a second PUCCH resource configuration for a second PUCCH resource to the UE 110 as described at 505 of FIG. 5. In aspects, the second PUCCH resource configuration uses air interface resource partitioning defined by the second RAT.

At 610, the base station receives a first air interface resource configuration for a first air interface resource allocated to a first cell that uses a first RAT. To illustrate, the base station 502 receives a first PUCCH resource configuration from the base station 501 as described at 515 of FIG. 5, where a cell/coverage area provided by the base station 502 at least partially overlaps with a cell/coverage area provided by the base station 501. In aspects, the first air interface resource configuration (e.g., the first PUCCH resource configuration) differs from the second air interface resource configuration (e.g., the first PUCCH resource does not overlap with the second PUCCH resource in either time or frequency). In aspects, the first air interface resource configuration uses air interface resource partitioning defined by the first RAT and/or common air interface resource partitioning used by the first RAT and the second RAT.

At 615, the base station communicates the first air interface resource configuration to the UE. For example, as described at 520 of FIG. 5, the base station 502 communicates the first PUCCH resource configuration to the UE 110, such as through an RRC message transmitted using the second RAT implemented by the base station 502.

At 620, the base station receives a low-utilization indication for the first air interface resource. To illustrate, the base station 502 receives the low-utilization indication from the base station 501 as described at 530 of FIG. 5.

At 625, the base station directs the UE to utilize the first air interface resource for transmitting uplink communications to the base station using the second RAT. For example, as described at 540 of FIG. 5, the base station 502 directs the UE 110 to utilize the first PUCCH resource. In some aspects, the base station 502 communicates a start time, stop time, and/or air interface resource availability (e.g., PUCCH-resource-availability) time duration to the UE 110. Alternatively or additionally, the base station 502 communicates a toggle field that indicates an availability of the first air interface resource (e.g., the first PUCCH resource).

FIG. 7 illustrates an example method 700 used to perform aspects of enhanced uplink spectrum sharing, such as sharing physical uplink control channel (PUCCH) resources allocated to a first cell that uses a first radio access technology (RAT) with a second cell that uses a second RAT. In some implementations, operations of the method 700 are performed by a user equipment, such as the UE 110 of FIG. 1.

At 705, a UE receives a second air interface resource configuration for a second air interface resource from a base station. For example, as described at 505 of FIG. 5, the UE 110 receives a second PUCCH resource configuration from the base station 502 during an initial access procedure, an RRC configuration message, and/or an RRC reconfiguration message. In aspects, the second air interface resource (e.g., the second PUCCH resource) is allocated to a second cell that uses a second RAT, where the second air interface resource configuration uses air interface resource partitioning defined by the second RAT.

At 710, the UE receives, from the base station, a first air interface resource configuration for a first air interface resource allocated to a first cell that uses a first RAT. To illustrate, the UE 110 receives a first PUCCH resource configuration from the base station 502 as described at 520 of FIG. 5. Alternatively, or additionally, the first air interface resource configuration differs from the second air interface resource configuration (e.g., the second air interface resource configuration and the first air interface resource configuration do not overlap). In aspects, the first cell and the second cell at least partially overlap. Alternatively, or additionally, the first base station and the second base station include elements (e.g., a baseband unit, a baseband processor) that are co-located. In aspects, the first air interface resource configuration uses air interface resource partitioning defined by the first RAT and/or common air interface resource partitioning utilized by the first RAT and the second RAT.

At 715, the UE receives, from the base station, an indication to utilize the first air interface resource for uplink communications to the base station and using the second RAT. For example, as described at 540 of FIG. 5, the UE 110 receives an indication to utilize the first PUCCH resource from the base station 502 in a MAC CE, in PDCCH messaging, layer 1 signaling, layer 2 messaging, and/or an RRC message. In some aspects, the UE 110 receives a start time, a stop time, and/or an air interface resource availability (e.g., a PUCCH-resource-availability) time duration that (collectively or singularly) indicate when to begin and/or cease using the first air interface resource. Alternatively, or additionally, the UE receives a toggle field that indicates an availability (e.g., available, unavailable) of the first air interface resource.

At 720, the UE transmits, to the base station, a first uplink communication of the uplink communications using the first air interface resource and the second RAT. To illustrate, as described at 545 of FIG. 5, the UE 110 transmits an uplink communication to the base station 502 using the first PUCCH resource and the second RAT.

FIG. 8 illustrates an example method 800 used to perform aspects of enhanced uplink spectrum sharing, such as sharing a physical uplink control channel (PUCCH) resource statically allocated to a first cell that uses a first radio access technology (RAT) with a second cell that uses a second RAT implemented by the second base station. In some implementations, operations of the method 800 are performed by a base station, such as the base station 120 of FIG. 1 and/or the base station 501 of FIG. 5.

At 805, a first base station communicates, to a second base station, an air interface resource configuration for an air interface resource allocated to a first cell that uses a first RAT. For example, the base station 501 communicates a first PUCCH resource configuration to the base station 502 as described at 515 of FIG. 5. In aspects, the first cell/coverage area at least partially overlaps with the second cell/coverage area. At times, the base station 502 and the base station 501 include elements (e.g., a baseband unit, a baseband processor) that are co-located.

At 810, the first base station detects low utilization of the air interface resource. To illustrate, as described at 525 of FIG. 5, the base station 501 detects one or more conditions that indicate low utilization of the PUCCH resource, such as a lack of downlink communications over the PDSCH.

At 815, the first base station communicates a low-utilization indication to the second base station to direct the second base station to utilize the air interface resource. For example, the base station 501 communicates the low-utilization indication to the base station 502 as described at 530 of FIG. 5.

The order in which the method blocks of the method 600, 700, and 800 are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although techniques and devices for enhanced uplink spectrum sharing have been described in language specific to features and/or methods, it is to be understood that the subject of the appended claims is not necessarily limited to the specific features or methods described. Rather, the specific features and methods are disclosed as example implementations of enhanced uplink spectrum sharing.

In the following, several examples are described:

Example 1: A method performed by a second base station for sharing physical uplink control channel, PUCCH, resources allocated to a first cell that uses a first radio access technology, RAT, with a second cell that uses a second RAT and implemented by the second base station, the method comprising: communicating, to a user equipment, UE, a second PUCCH resource configuration for a second PUCCH resource allocated to the second cell that uses the second RAT; receiving, from a first base station a first PUCCH resource configuration for a first PUCCH resource allocated to the first cell that uses the first RAT, the first PUCCH resource being different from the second PUCCH resource, the first cell at least partially overlapping with the second cell; communicating, to the UE, the first PUCCH resource configuration; receiving a low-utilization indication for the first PUCCH resource; and based on receiving the low-utilization indication, directing the UE to utilize the first PUCCH resource for transmitting uplink communications to the second base station using the second RAT.

Example 2: The method as recited in example 1, further comprising: receiving, from the UE, a first uplink communication using the first PUCCH resource and the second RAT.

Example 3: The method as recited in example 2, wherein receiving the first uplink communication further comprises: receiving control-plane information from the UE; or receiving user-plane data from the UE.

Example 4: The method as recited in any one of examples 2 and 3, wherein receiving the first uplink communication further comprises: receiving, as the control-plane information, an acknowledge, ACK, or a negative-acknowledge, NACK, for a downlink communication transmitted by the base station to the UE using the second RAT.

Example 5: The method as recited in any one of examples 2 to 4, further comprising: receiving, from the UE, a second uplink communication using the second PUCCH resource and the second RAT.

Example 6: The method as recited in any one of examples 1 to 5, wherein communicating the second PUCCH resource configuration further comprises: communicating at least one of: a start time to begin using the first PUCCH resource; or a stop time to cease using the first PUCCH resource.

Example 7: The method as recited in any one of examples 1 to 6, wherein receiving the low-utilization indication for the first PUCCH resource further comprises: receiving a toggle field that indicates an availability of the first PUCCH resource.

Example 8: The method as recited in any one of examples 1 to 7, wherein the first base station and the second base station are co-located.

Example 9: The method as recited in any one of examples 1 to 8, wherein receiving the low-utilization indication further comprises: receiving the low-utilization indication from the second base station.

Example 10: The method as recited in any one of examples 1 to 9, wherein receiving the first PUCCH resource configuration further comprises: receiving the first PUCCH resource configuration from the first base station using an Xn interface.

Example 11: The method as recited in any one of examples 1 to 10, wherein the first PUCCH resource configuration specifies a different frequency partition than the second PUCCH resource configuration.

Example 12: The method as recited in any one of examples 1 to 11, wherein the first PUCCH resource configuration indicates at least one of: a resource block allocation; a PUCCH region; a reference signal structure; or a coding scheme.

Example 13: The method as recited in any one of examples 1 to 12, wherein directing the UE to utilize the first PUCCH resource further comprises: using a radio resource control, RRC, message to direct the UE to utilize the first PUCCH resource; using a Medium Access Control, MAC, control element, CE, to direct the UE to utilize the first PUCCH resource; or using layer 1 signaling to direct the UE to utilize the first PUCCH resource.

Example 14: The method as recited in any one of examples 1 to 13, wherein directing the UE to utilize the first PUCCH resource further comprises: directing the UE to utilize the first PUCCH resource while the UE operates in a standalone mode.

Example 15: A method performed by a user equipment, UE, for sharing physical uplink control channel, PUCCH, resources allocated to a first cell that uses a first radio access technology, RAT, with a second cell that uses a second RAT implemented by a base station, the method comprising:

receiving, from the base station, a second PUCCH resource configuration for a second PUCCH resource allocated to the second cell that uses the second RAT; receiving, from the base station, a first PUCCH resource configuration for a first PUCCH resource allocated to the first cell that uses the first RAT, the first PUCCH resource being different from the second PUCCH resource, the first cell at least partially overlapping with the second cell; receiving, from the base station, an indication to utilize the first PUCCH resource for uplink communications to the base station using the second RAT; and transmitting a first uplink communication to the base station using the first PUCCH resource and the second RAT.

Example 16: The method as recited in example 15, wherein receiving the indication to utilize the first PUCCH resource further comprises at least one of: receiving a start time to begin using the first PUCCH resource; receiving a stop time to cease using the first PUCCH resource; or receiving a toggle field that indicates an availability of the first PUCCH resource.

Example 17: The method as recited in example 15 or example 16 wherein transmitting the first uplink communication comprises: transmitting control-plane information using the first PUCCH resource and the second RAT.

Example 18: The method as recited in example 17, wherein transmitting the control-plane information for the second RAT using the first PUCCH resource further comprises:

transmitting an acknowledge, ACK, or a negative-acknowledge, NACK, for a downlink communication received from the base station and using the second RAT.

Example 19: The method as recited in any one of examples 15 to 18, wherein the first PUCCH resource configuration indicates a different frequency partition from the second PUCCH resource configuration.

Example 20: The method as recited in any one of examples 15 to 19, wherein the first PUCCH resource configuration indicates at least one of: a resource block allocation; a PUCCH region; a reference signal structure; or a coding scheme.

Example 21: The method as recited in any one of examples 15 to 20, wherein receiving the indication to utilize the first PUCCH resource further comprises: receiving the indication in a radio resource control, RRC, message; receiving the indication in a Medium Access Control, MAC, control element, CE; or receiving the indication in layer 1 signaling.

Example 22: The method as recited in any one of examples 15 to 21, wherein transmitting the first uplink communication further comprises: transmitting the first uplink communication while operating in a standalone mode.

Example 23: The method as recited in any one of examples 15 to 22, wherein transmitting the first uplink communication further comprises: encoding the first uplink communication using identity information associated with the base station.

Example 24: The method as recited in any one of examples 15 to 23, further comprising: transmitting, to the base station a second uplink communication using the second PUCCH resource and the second RAT.

Example 25: A method performed by a first base station for sharing an air interface resource allocated to a first cell that uses first radio access technology, RAT, implemented by the first base station with a second cell that uses a second RAT implemented by a second base station, the method comprising: communicating, to the second base station, a physical uplink control channel, PUCCH, resource configuration of a PUCCH resource allocated to the first cell that uses the first RAT, the first cell at least partially overlapping with the second cell; detecting low utilization of the PUCCH resource; and based on detecting the low utilization, communicating a low-utilization indication to the second base station.

Example 26: The method as recited in example 25, wherein communicating the low-utilization indication further comprises: communicating a start time to begin using the PUCCH resource; or communicating a toggle field that indicates the PUCCH resource is available.

Example 27: The method as recited in example 25 or example 26, further comprising communicating, subsequent to communicating the low-utilization indication, one of: a stop time to cease using the PUCCH resource; or a toggle field that indicates the PUCCH resource is unavailable.

Example 28: The method as recited in example 27, further comprising: receiving, after the stop time, an uplink communication on the PUCCH resource using the first RAT, the uplink communication directed to the first base station.

Example 29: The method as recited in any one of examples 25 to 28, wherein detecting low utilization of the PUCCH resource further comprises: determining an expected number of transmissions that use the PUCCH resource is below a threshold value.

Example 30: The method as recited in example 29, wherein detecting low utilization of the PUCCH resource further comprises: determining an expected number of acknowledgment/negative-acknowledgments, ACK/ NACKs, that use the PUCCH resource.

Example 31: A method performed by a base station for sharing air interface resources allocated to a second cell that uses a second radio access technology, RAT, with a first cell that uses a first RAT and implemented by the base station, the method comprising: communicating, to a user equipment, UE, a first air interface resource configuration for a first air interface resource allocated to the first cell that uses the first RAT and implemented by the base station; receiving a second air interface resource configuration of a second air interface resource allocated to the second cell that uses the second RAT, the second air interface resource being different from the first air interface resource, the second cell at least partially overlapping with the first cell; communicating, to the UE, the second air interface resource configuration; receiving a low-utilization indication for the second air interface resource; and based on receiving the low-utilization indication, directing the UE to utilize the second air interface resource for transmitting communications using the first RAT and to the base station.

Example 32: The method as recited in example 31, wherein the first air interface resource configuration for the first air interface resource is a first physical uplink control channel, PUCCH, air interface resource configuration for a first PUCCH resource, and wherein the second air interface resource configuration for the second air interface resource is a second PUCCH resource configuration for a second PUCCH resource.

Example 33: A method performed by a user equipment, UE, for sharing air interface resources allocated to a second cell that uses a second radio access technology, RAT, with a first cell that uses a first RAT implemented by a base station, the method comprising: receiving, from the base station, a first air interface resource configuration for a first air interface resource allocated to the first cell that uses the first RAT; receiving, from the base station, a second air interface resource configuration for a second air interface resource allocated to the second cell that uses the second RAT, the second air interface resource being different from the first air interface resource, the second cell at least partially overlapping with the first cell; receiving, from the base station, an indication to utilize the second air interface resource for communicating with the base station using the first RAT; and transmitting signals to the base station using the second air interface resource and the first RAT.

Example 34: The method as recited in example 33, wherein the first air interface resource configuration for the first air interface resource is a first physical uplink control channel, PUCCH, air interface resource configuration for a first PUCCH resource, and wherein the second air interface resource configuration for the second air interface resource is a second PUCCH resource configuration for a second PUCCH resource.

Example 35: The method as recited in any one of examples 2 to 5, further comprising: directing the UE transmit uplink data channel communications on the first PUCCH time-frequency resources.

Example 36: The method as recited in example 35, further comprising: receiving, from the UE, an uplink data channel communication on the first PUCCH time-frequency resources.

Example 37: The method as recited in example 15, further comprising: receiving directions to use the first PUCCH resource or the second PUCCH resource for an uplink data channel.

Example 38: The method as recited in example 37, further comprising: transmitting an uplink data channel communication using the first PUCCH time-frequency resource or the second PUCCH time-frequency resource.

Example 39: A method performed by a second base station for sharing air interface resources allocated to a first cell that uses a first radio access technology, RAT, with a second cell that uses a second RAT and implemented by the second base station, the method comprising: communicating, to a user equipment, UE, a second air interface resource configuration for a second air interface resource allocated to the second cell that uses the second RAT; receiving, from a first base station, a first air interface resource configuration for a first air interface resource allocated to the first cell that uses the first RAT, with the first air interface resource configuration being different from the second air interface resource configuration, and with the first cell at least partially overlapping the second cell; communicating, to the UE, the first air interface resource configuration; receiving a low-utilization indication for the first air interface resource; based on receiving the low-utilization indication, directing the UE to utilize the first air interface resource for transmitting uplink communications to the second base station using the second RAT; and receiving, from the UE, a first uplink communication using the first air interface resource and the second RAT.

Example 40: The method as recited in example 39, wherein the first air interface resource configuration for the first air interface resource is a first physical uplink control channel, PUCCH, air interface resource configuration for a first PUCCH resource, and wherein the second air interface resource configuration for the second air interface resource is a second PUCCH resource configuration for a second PUCCH resource.

Example 41: The method as recited in example 39 or example 40, further comprising: receiving, from the UE, a second uplink communication using the second air interface resource and the second RAT.

Example 42: The method as recited in any one of examples 39 to 41, wherein receiving the first uplink communication further comprises: receiving control-plane information from the UE; or receiving user-plane data from the UE.

Example 43: The method as recited in any one of examples 39 to 42, wherein receiving the first uplink communication further comprises: receiving, as the control-plane information, an acknowledge, ACK, or a negative-acknowledge, NACK, for a downlink communication transmitted by the second base station to the UE using the second RAT.

Example 44: The method as recited in any one of examples 39 to 43, wherein communicating the second air interface resource configuration further comprises: communicating at least one of: a start time to begin using the first air interface resource; or a stop time to cease using the first air interface resource.

Example 45: The method as recited in any one of examples 39 to 44, wherein receiving the low-utilization indication for the first PUCCH resource further comprises: receiving a toggle field that indicates an availability of the first PUCCH resource.

Example 46: The method as recited in any one of examples 39 to 45, wherein receiving the low-utilization indication further comprises: receiving the low-utilization indication from the second base station.

Example 47: The method as recited in any one of examples 39 to 46, wherein the first air interface resource configuration specifies one or more different air interface resource configuration parameters than the second air interface resource configuration, the one or more different air interface resource configuration parameters comprising one or more of: a frequency partition; a resource block allocation; a PUCCH region; a reference signal structure; or a coding scheme.

Example 48: A method performed by a user equipment, UE, for sharing air interface resources allocated to a first cell that uses a first radio access technology, RAT, with a second cell that uses a second RAT implemented by a base station, the method comprising: receiving, from the base station, a second air interface resource configuration for a second air interface resource allocated to the second cell that uses the second RAT; receiving, from the base station, a first air interface resource configuration for a first air interface resource allocated to the first cell that uses the first RAT, with the first air interface resource configuration being different from the second air interface resource configuration, and with the first cell at least partially overlapping the second cell; receiving, from the base station, an indication to utilize the first air interface resource for uplink communications to the base station using the second RAT; and transmitting a first uplink communication to the base station using the first air interface resource and the second RAT.

Example 49: The method as recited in example 48, wherein the first air interface resource configuration for the first air interface resource is a first physical uplink control channel, PUCCH, air interface resource configuration for a first PUCCH resource, and wherein the second air interface resource configuration for the second air interface resource is a second PUCCH resource configuration for a second PUCCH resource.

Example 50: The method as recited in example 48 or example 49, further comprising: transmitting, to the base station a second uplink communication using the second air interface resource and the second RAT.

Example 51: The method as recited in any one of examples 48 to 50, wherein receiving the indication to utilize the first PUCCH resource further comprises at least one of: receiving a start time to begin using the first PUCCH resource; receiving a stop time to cease using the first PUCCH resource; or receiving a toggle field that indicates an availability of the first PUCCH resource.

Example 52: The method as recited in any one of examples 48 to 51 wherein transmitting the first uplink communication comprises: transmitting control-plane information using the first PUCCH resource and the second RAT.

Example 53: The method as recited in any one of examples 48 to 52, wherein transmitting the first uplink communication further comprises: encoding the first uplink communication using identity information associated with the base station.

Example 54: A method performed by a first base station for sharing an air interface resource allocated to a first cell that uses a first radio access technology, RAT, implemented by the first base station with a second cell that uses a second RAT implemented by a second base station, the method comprising: communicating, to the second base station, an air interface resource configuration of the air interface resource allocated to the first cell that uses the first RAT, the first cell at least partially overlapping with the second cell; detecting low utilization of the air interface resource; and based on detecting the low utilization, communicating a low-utilization indication to the second base station.

Example 55: The method as recited in example 54, wherein the air interface resource configuration for the air interface resource is a first physical uplink control channel, PUCCH, air interface resource configuration for a first PUCCH resource.

Example 56: A base station comprising: a processor; and computer-readable storage media comprising instructions, responsive to execution by the processor, direct the base station to perform a method as recited in any one of examples 1-14, 25 to 32, 35, 36, 39 to 47, 54, and 55.

Example 57: A user equipment comprising: a processor; and computer-readable storage media comprising instructions, responsive to execution by the processor, direct the user equipment to perform a method as recited in any one of the examples 15 to 24, 33, 34, 37, 38, and 48 to 53.

Example 58: A computer-readable storage media comprising instructions that, responsive to execution by a processor, perform a method as recited in any one of examples 1 to 53 to be performed.

What is claimed is:

1. A method performed by a second base station for sharing a first air interface resource allocated to a first cell that uses a first radio access technology (RAT) and is implemented by a first base station, with a second cell that uses a second RAT and is implemented by the second base station, the method comprising:

communicating, to a user equipment (UE) a second air interface resource configuration for a second air interface resource allocated to the second cell that uses the second RAT;

receiving, from the first base station, a first air interface resource configuration for the first air interface resource allocated to the first cell that uses the first RAT, the first air interface resource configuration being different from the second air interface resource configuration, and the first cell at least partially overlapping the second cell;

communicating, to the UE, the first air interface resource configuration;

receiving, from the first base station, a low-utilization indication for the first air interface resource;

based on receiving the low-utilization indication, directing the UE to utilize the first air interface resource for transmitting uplink communications to the second base station using the second RAT; and receiving, from the UE, a first uplink communication using the first air interface resource and the second RAT.

2. The method as recited in claim 1, wherein the first air interface resource configuration for the first air interface resource is a first physical uplink control channel (PUCCH) air interface resource configuration for a first PUCCH resource, and wherein the second air interface resource configuration for the second air interface resource is a second PUCCH resource configuration for a second PUCCH resource.

3. The method as recited in claim 2, wherein receiving the low-utilization indication for the first PUCCH resource further comprises:

receiving a toggle field that indicates an availability of the first PUCCH resource.

4. The method as recited in claim 1, further comprising:

receiving, from the UE, a second uplink communication using the second air interface resource and the second RAT.

5. The method as recited in claim 1, wherein receiving the first uplink communication further comprises:

receiving control-plane information from the UE; or receiving user-plane data from the UE.

6. The method as recited in claim 1, wherein receiving the first uplink communication further comprises:

receiving, as control-plane information, an acknowledge (ACK) or a negative-acknowledge (NACK) for a downlink communication transmitted by the second base station to the UE using the second RAT.

7. The method as recited in claim 1, wherein communicating the second air interface resource configuration comprises communicating at least one of:

a start time to begin using the first air interface resource; or a stop time to cease using the first air interface resource.

8. The method as recited in claim 1, wherein communicating, to the UE, the first air interface resource configuration comprises:

directing the UE to refrain from using the first air interface resource until receiving a notification from the second base station.

9. The method as recited in claim 1, wherein the first air interface resource configuration specifies one or more different air interface resource configuration parameters than the second air interface resource configuration, the one or more different air interface resource configuration parameters comprising one or more of:

a frequency partition;

a resource block allocation;

a PUCCH region;

a reference signal structure; or a coding scheme.

10. A method performed by a user equipment (UE) for using a first air interface resource allocated to a first cell that uses a first radio access technology (RAT) and is implemented by a first base station, to communicate via a second cell that uses a second RAT and is implemented by a second base station, the method comprising:

receiving, from the second base station, a second air interface resource configuration for a second air interface resource allocated to the second cell that uses the second RAT;

receiving, from the second base station, a first air interface resource configuration for a first air interface resource allocated to the first cell that uses the first RAT, with the first air interface resource configuration being different from the second air interface resource configuration, and with the first cell at least partially overlapping the second cell;

receiving, from the second base station, an indication to utilize the first air interface resource for uplink communications to the second base station using the second RAT; and transmitting a first uplink communication to the second base station using the first air interface resource and the second RAT.

11. The method as recited in claim 10, wherein the first air interface resource configuration for the first air interface resource is a first physical uplink control channel (PUCCH) air interface resource configuration for a first PUCCH resource, and wherein the second air interface resource configuration for the second air interface resource is a second PUCCH resource configuration for a second PUCCH resource.

12. The method as recited in claim 11, wherein receiving the indication comprises at least one of:

receiving a start time to begin using the first PUCCH resource;

receiving a stop time to cease using the first PUCCH resource; or receiving a toggle field that indicates an availability of the first PUCCH resource.

13. The method as recited in claim 10, further comprising:

transmitting, to the second base station, a second uplink communication using the second air interface resource and the second RAT.

14. The method as recited in claim 10, wherein transmitting the first uplink communication further comprises:

encoding the first uplink communication using identity information associated with the second base station.

15. A second base station comprising:

a processor; and computer-readable storage media comprising instructions, responsive to execution by the processor, direct the second base station to:

communicate, to a user equipment (UE) a second air interface resource configuration for a second air interface resource allocated to a second cell that uses a second radio access technology (RAT) and is implemented by the second base station;

receive, from a first base station, a first air interface resource configuration for a first air interface resource allocated to a first cell that uses a first RAT and is implemented by the first base station, with the first air interface resource configuration being different from the second air interface resource configuration, and with the first cell at least partially overlapping the second cell;

communicate, to the UE, the first air interface resource configuration;

receive, from the first base station, a low-utilization indication for the first air interface resource;

based on the reception of the low-utilization indication, direct the UE to utilize the first air interface resource for transmitting uplink communications to the base station using the second RAT; and receive, from the UE, a first uplink communication using the first air interface resource and the second RAT.

16. The second base station of claim 15, wherein the first air interface resource configuration for the first air interface resource is a first physical uplink control channel (PUCCH) air interface resource configuration for a first PUCCH resource, and wherein the second air interface resource configuration for the second air interface resource is a second PUCCH resource configuration for a second PUCCH resource.

\* \* \* \* \*